July 29, 1969  B. A. JOHNSON ETAL  3,457,791
SURFACE AREA MEASUREMENT OF STANDARD LENGTH SAMPLE OF
FINELY DIVIDED SOLIDS
Original Filed Nov. 29, 1966  2 Sheets-Sheet 1

INVENTORS
BERNARD A. JOHNSON
MAX ADAMSKI, JR.
WIESLAW L. LICHODZIEJEWSKI
Cushman, Darby & Cushman
ATTORNEYS July 29, 1969

B. A. JOHNSON ET AL 3,457,791

SURFACE AREA MEASUREMENT OF STANDARD LENGTH SAMPLE OF
FINELY DIVIDED SOLIDS

Original Filed Nov. 29, 1966

INVENTORS
BERNARD A. JOHNSON
MAX ADAMSKI, JR
WIESLAW L. LICHODZIEJEWSKI
BY Cushman, Darby & Cushman
ATTORNEYS

3,457,791
SURFACE AREA MEASUREMENT OF STANDARD LENGTH SAMPLE OF FINELY DIVIDED SOLIDS

Bernard A. Johnson, Deerfield, Max Adamski, Jr., Wheeling, and Wieslaw L. Lichodziejewski, Evanston, Ill., assignors to Fuller Company, Catasauqua, Pa., a corporation of Delaware
Continuation of application Ser. No. 597,628, Nov. 29, 1966. This application Sept. 3, 1968, Ser. No. 761,887
Int. Cl. G01n *33/00*
U.S. Cl. 73—432                    13 Claims

ABSTRACT OF THE DISCLOSURE

A method for determining the particle size of a powdered material of unknown weight consisting of the steps of placing a sample in a vertical tube and vibrating the material while measuring its electrical capacitance. When the measurement reaches a predetermined value, the vibrating is stopped and the sample is cut to a predetermined length to ensure that for a given material the sample will have a standard weight, volume, shape, porosity, and length. This sample is then subjected to a permeability test which yields a result that is indicative of the particle size of the material.

---

This application is a continuation of copending application Ser. No. 597,628, filed Nov. 29, 1966, now abandoned.

This invention relates to a novel technique for preparing and testing a sample of comminuted solid material to determine the fineness of the material. More particularly, it relates to improved apparatus and methods which make use of the known relationship between the fluid permeability of a sample of powered material and the particle size of the material.

Known fluid permeability test for determining the particle size of a powdered solid material are based on the principle that the resistance to the flow of a fluid through the sample is a function of, among other variables, the total surface area of the sample. When these other variables are eliminated, or standardized, the permeability measurement is directly related to the surface area of the sample. The surface area measurement may be readily converted by a simple calculation to particle size provided the density, size and shape of the sample are known or at least constant for each sample.

More specifically, permeability tests are based on the following mathematical relationship known as the Kozeny-Carman equation:

$$S^2 = \frac{g_c}{\mu v K \rho} \cdot \frac{\Delta p}{L} \cdot \frac{\epsilon^3}{(1-\epsilon)^2}$$

where $S$ = surface area
$g_c$ = gravitational constant
$\mu$ = fluid viscosity
$K$ = shape factor of the sample
$L$ = length of sample
$\epsilon$ = porosity of sample, percentage volume of voids per unit total volume
$p$ = fluid pressure differential across the sample
$v$ = fluid velocity through the sample
$\rho$ = density of sample material For any particular series of tests on the same kind of material at the same temperature and with the same permeability measuring instrument, $K$, $\rho$ and $\mu$ may be assumed to be constants, thus leaving four variables, $L$, $\epsilon$, $\Delta p$ and $v$. It is conventional practice to prepare a sample by weighing out a predetermined standard weight of the powdered material and compacting it to a predetermined volume of standard shape before subjecting it to a permeability test. Conventionally, also the permeability testing instrument employs a single gas under standard conditions for each sample. For each test, therefore, the values for $\mu$, $K$, $L$, $\rho$ and $\epsilon$ are constant. This leaves the surface area $S$ a direct function of the differential pressure and the gas flow velocity which the testing instrument is designed to measure. When the instrument has been calibrated with a standard sample of known surface area, the permeability measurement of a sample of unknown surface area is directly readable in units of surface area.

The actual measurement of permeability, or resistance to gas flow through the sample under the influence of a pressure gradient is made in practice in any of several different ways. For example, the permeability may be measured by applying an initial differential pressure across the sample and measuring the time required for the differential to reduce by a predetermined value. Alternatively, a constant gas flow through the sample may be established and the pressure differential across the sample measured. Alternatively, a fixed differential pressure may be applied across the sample, and the gas flow rate through the sample is measured. In each case the time, pressure or flow measurements are indications of surface area and may be converted to actual particle size after the instrument has been calibrated in a known manner.

The actual measurements of gas permeability which are briefly discussed above are well suited to manual testing, because the actual measurements can be directly related to surface area without employing data processing equipment. However, the overall technique, which includes a critical weighing step, does not lend itself well to automation of grinding equipment or other process equipment, because of the many operations involved and the expensive and sensitive weighing equipment required.

It is the primary object of the present invention to provide a gas permeability technique for measuring surface area of powdered materials, including both method and apparatus, which retains the operational advantages of known permeability techniques while being well adapted to automated operation and to being readily incorporated in a control loop for a grinding operation or other process.

It is another object of the present invention to provide a method and apparatus for measuring the particle size of powdered materials which achieve advantages of simplicity and economy by eliminating the weighing of the sample of material prior to testing.

It is a more specific object to eliminate the weighing step in preparing a sample for testing with known permeability techniques by compacting a portion of the material to a standard porosity, or density, and then adjusting the size of the compacted mass to give a sample of standard weight and volume. According to the principles of the present invention measurement of particle size is effected by obtaining an unweighed sample of the powdered material to be tested, compacting the unweighed sample into a shape having a standard cross section, continuing the compaction until the sample reaches a standard porosity, or density, removing a longitudinal portion of the sample to reduce the longitudinal dimension of the sample to a standard length and then measuring the permeability of the sample in lengthwise direction by a known technique. From the Kozeny-Carman equation it will be seen that, under these conditions, the only variable are pressure differential and air velocity. As already described, conventional equipment is available for measuring these variables in terms of surface area.

In the detailed description of a preferred embodiment of the invention which follows the compacting of the powdered material to a predetermined porosity, or density, is effected by placing a sample of unknown weight of the material in a vertical tube or the like and vibrating the material or the tube or both for a period of time while measuring the electrical capacitance of the sample. When the capacitance measurement reaches a predetermined value, the vibrations are stopped, and the upper end portion of the compacted sample is then cut off at a predetermined distance from the lower end. For a given material the resulting sample has a standard weight, volume, shape and length just as if it had been prepared by the conventional method of first weighing out a standard weight of the powdered material and subsequently compacting it to a standard volume. Thereafter, the sample is subjected to a conventional gas permeability test to obtain the particle size of the material.

The actual value of the capacitance measurement is a function of the compactness or porosity of the sample and the dielectric constant of the material being tested. Accordingly, for a given material the gas permeability measurements are a direct measure of surface area after the instrument has been calibrated for that material. The gas permeability measurements for a material of different dielectric constant will read directly in units of surface area only after the instrument has been calibrated for the new material.

It will be understood that the compaction step and the porosity measurement may be carried out by other means than those illustrated and that the success of the method of the invention does not depend on the specific apparatus illustrated in the drawings.

In the drawings—

FIGURE 2 is a schematic view of the pneumatic circuit of the machine of FIGURE 1.

Figure 1:
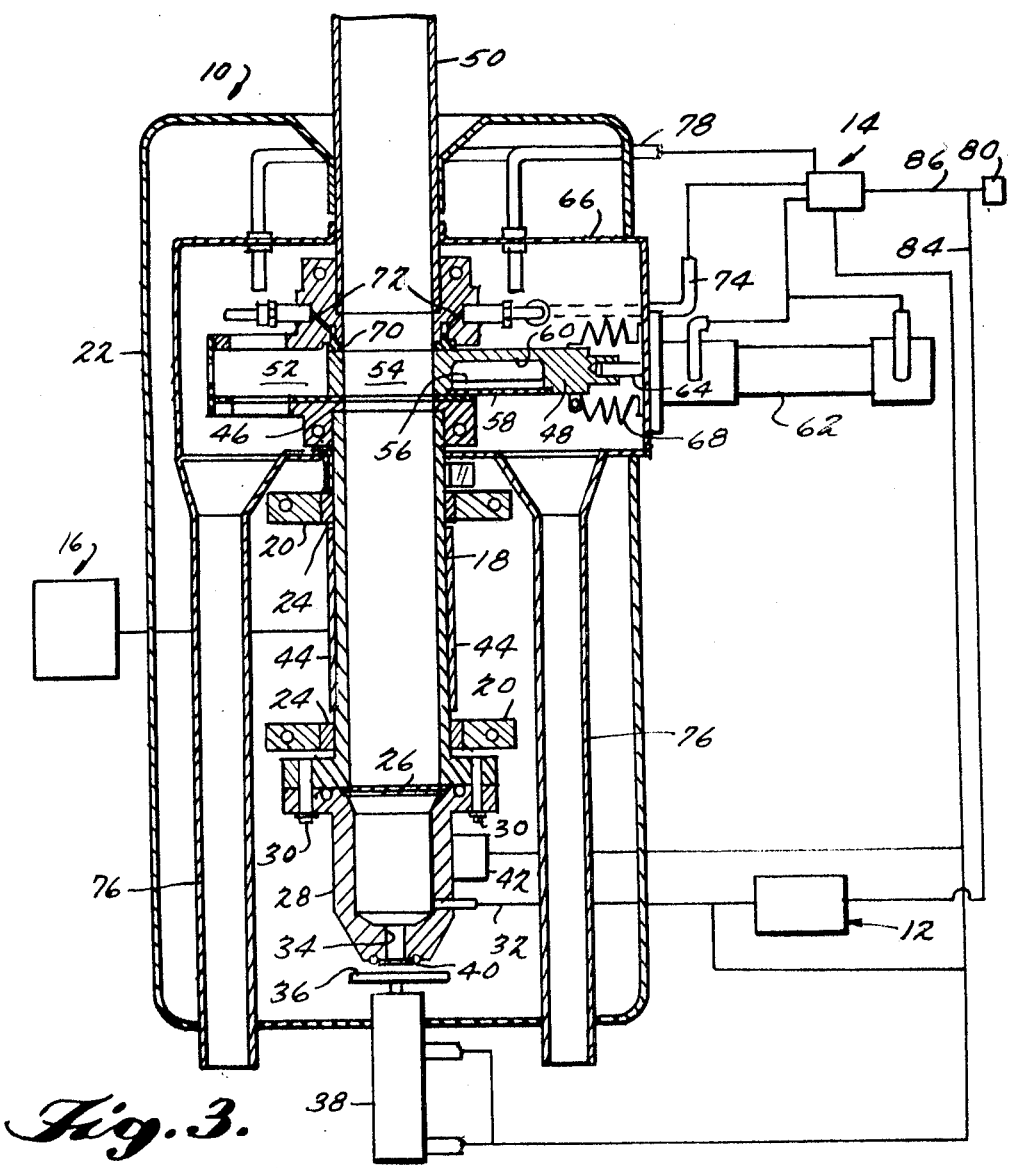
FIGURE 1 is a vertical sectional view, partly schematic, of a machine for shaping and retaining a sample and embodying the principles of the present invention.
Figure 3:
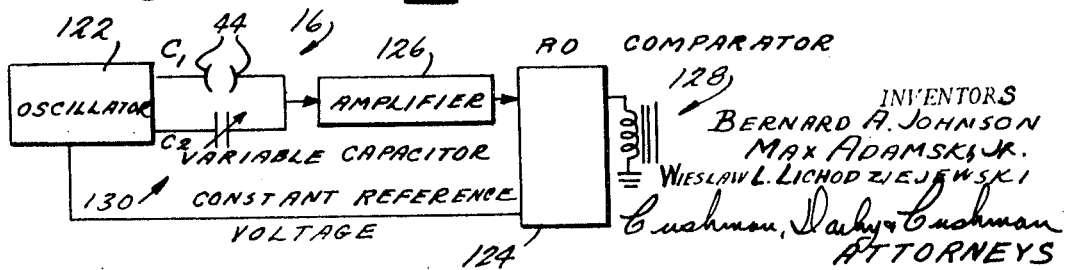
FIGURE 3 is a schematic view of the capacitor circuit of the machine of FIGURE 1.

FIGURE 1 illustrates partly in schematic fashion a sampler 10 which, together with the pneumatic and electrical circuits of FIGURES 2 and 3, measures the permeability of a powdered material by the techniques of the present invention. In practice the mechanical components of the sampler 10 and all the auxiliary components will normally be arranged in a single housing (not shown) so as to constitute a single compact unit capable of making permeability measurements when it is connected to a source of the powdered material to be tested. These auxiliary components include a pneumatic circuit 12 for measuring permeability of a sample in the sampler 10, a pneumatic control circuit 14 for operating the sampler 10 and a capacitor circuit 16 for measuring the density of a sample in the sampler 10. For simplicity of illustration the details of the circuits 14 and 16 are omitted from FIGURE 1 and are shown only diagrammatically in FIGURES 2 and 3. The components of the permeability measuring circuit 12 are not illustrated inasmuch as the circuit may be of any known construction suitable for measuring the resistance to the flow of gas through a sample of material. In the embodiment illustrated the instrument 12 is considered to be of the type which includes one or more pressure regulators and piping for effecting a constant differential air pressure across a sample in the sampler 10 and a sensitive flow meter for measuring the rate of air flow through the sample.

The major component of the sampler 10 is a vertical cylindrical sample tube 18 which is adapted to receive powdered material to be tested, to shape the material into a test sample and to retain the sample during a test. Conveniently the tube 18 is constructed of a dielectric material capable of withstanding temperatures up to about 220° F. without distortion. Vertically spaced apart brackets 20 which are fixed to the inner surface of a housing 22 support the tube in its operative position. Vibration isolation pads 24 of rubber or similar material are provided between the tube 18 and the clamping surfaces of the brackets 20. The tube 18 is adapted to retain a sample of test material on a porous plate 26 which prevents downward passage of test material while permitting upward flow of gas. The porous plate 26 is held in position by being clamped between the lower end of the tube 18 and a hollow flanged end piece 28 which is attached to the tube 18 with bolts 30. A sintered bronze filter $\frac{1}{16}$ inch thick having a 51–128 pore size is suitable as the material of the plate 26.

The lower end piece 28 defines an air passage for directing air upwardly through the porous plate 26 and into the sample tube 18. Air is delivered laterally into the end piece 28 through a line 32 under the control of the permeability measuring circuit 12 or the pneumatic control circuit 14 as illustrated more fully in FIGURE 2. During a permeability test the air flow is controlled by the circuit 12. The sample in the tube 18 will subsequently be ejected upwardly by a blast of air obtained from the control circuit 14. Any solids which pass downwardly through the porous plate 26 may be removed through a vertical passage 34 in the lower end of the end piece 28. The passage 34 will be closed during a test by a plunger 36 which is movable into engagement with the end piece 28 by a vertically disposed pneumatic ram 38. Loss of test air from the end piece 28 is prevented by a sealing ring 40 which is compressed when the plunger 36 engages the end piece 28.

Test material in the tube 18 is compacted prior to testing by a pneumatic vibrator 42 of conventional construction. As shown, the vibrator 42 is mechanically attached to the lower end piece 28 so that vibrations are transmitted through this component to the tube 18. If desired, of course, the vibrator may be attached directly to the tube 18. The two opposite sides of the tube 18 between the brackets 20 are each provided with a separate capacitor plate 44 which is connected into the capacitance measuring circuit 16. This circuit, as more fully described with reference to FIGURE 3, measures the density of the test material during compaction in terms of the capacitance of the test material.

The upper end of the sample tube 18 is fitted into an end piece 46 which carries a sample cutoff gate 48 employed to remove a portion of the test material in the sample tube 18 during preparation of a test sample. The upper end of the end piece 46 provides communication with a conduit 50 for conveying test material to and from the sample tube 18. The cutoff gate 48 is constructed in the form of a block which is slidable between two limiting positions within a transverse recess 52 in the end piece 46. In the right hand, or open position of the gate 48 illustrated in FIGURE 1 a vertical passage 54 in the gate is in alignment with the sample tube 18 so that there is free communication between the latter and the conduit 50. In the left-hand, or closed position of the gate 48 the upper end of the sample tube 18 communcates only with a cavity 56 in the lower surface of the gate 48, and passage of test material between the conduit 50 and the sample tube 18 is prevented. The face of the cavity 56 is provided with a screen 58 which is flush with the surface of the gate 48 so as to prevent lifting of the column of test material by upflowing gas during a test. A laterally facing vent 60 opens through the gate and allows test gas to pass through the cavity to the exterior of the sample tube 18.

The gate 48 is controlled by a horizontally disposed double-acting pneumatic ram 62 having a piston rod 64 connected to the right-hand end of the gate. The ram 62 is supported on a subhousing 66 which surrounds the upper end piece 46 and the gate 48. A protective bellows 68 is attached to the gate 48 and to the inside of the subhousing 66 in order to prevent the accumulation of loose test material on the piston rod 64.

In order to minimize leakage of test material past the gate 48 during a test there is provided an air spring seal which comprises a ring 70 disposed between the upper surface of the gate 48 and the adjacent surface of the end piece 46. The ring 70 resides in a groove in the end piece 46 and is forced against the gate 48 by air pressure admitted to the groove through passages 72 in the end piece 46. A compressed air line 74 supplies air to the passages 72 from the main pneumatic circuit 14. Test material which enters the subhousing 66 is removed through a pair of downwardly extending clean out tubes 76 which terminate in open ends disposed below the main housing 22. Cleaning air for forcing test material through the discharge tubes 76 is periodically admitted to the subhousing 66 by means of a compressed air line 78 from the main pneumatic circuit 14.

FIGURE 2 illustrates schematically the principal parts of a suitable pneumatic system for operating the moving parts of the sampler 10 and for measuring the permeability of a sample held in the sample tube 18. Compressed air for both the permeability measuring circuit 12 and the control cirucit 14 is obtained from a filtered source 80. The filtered air passes through a valve 82 and then into lines 84 and 86 which lead to the circuits 12 and 14, respectively. One branch 88 of the line 86 supplies air to the double-acting gate ram 62 through a 4-way valve 90. A second branch 92 of the line 86 supplies air to the double-acting plunger ram 38 through a 4-way valve 94, and a third branch 96 supplies air to the pneumatic vibrator 42 through a valve 98. The branch 92 also supplies sample ejection air through a 3-way valve 100 to the line 32 which connects with the lower end of the sample tube 18. In addition the branch 92 also supplies air to the spring seal line 74, the cleaning line 78 and to a plunger cleaning line 102. The latter is arranged to deliver a blast of air onto the upper surface of the plunger 36 to remove any test material which collects thereon. The lines 74, 78 and 102 are provided with valves 104, 106 and 108, respectively, for controlling the air flow to the various parts.

In FIGURE 2 the measuring circuit 16 is illustrated schematically as being arranged to supply a fixed air pressure to the lower end of a test sample in the sample tube 18 and to measure the rate of flow of air upwardly through the sample. The circuit includes pressure regulators 110 and 112 of conventional construction which supply constant pressure air to a sensitive flow meter 114 also of conventional construction. Conveniently the flow meter 114 may be of the heat transfer type. The air passing through the flow meter 114 is conducted to the air line 32 by way of a line 115 and a valve 116 and the 3-way valve 100. An electrical output line 118 from the flow meter 114 transmits an electrical signal which is proportional to the air flow through the flow meter 114. The signal may be employed by a monitoring instrument 120 which converts the signal to a visual or recorded indication of surface area. Alternatively, or in addition, the signal may be employed as the input to a control system governing an operation, such as a cement grinding operation, which produces the test material.

FIGURE 3 illustrates schematically the important components of the capacitance measuring circuit 16 associated with the sample tube 18. The circuit includes an oscillator 122 which delivers a constant voltage to one of the capacitor plates 44 and a constant reference voltage to a conventional comparator 124. The other capacitor plate 44 is connected to an amplifier 126 the output of which is transmitted to the comparator 124 for comparison with the reference voltage. When the two voltages are equal, the comparator 68 energizes a relay 128 thereby indicating that the test sample has been compacted to the standard porosity. The absolute level of the voltage passed to the amplifier 126 is controlled with a variable capacitor 130 connected between the amplifier and the oscillator 122.

In practice the pneumatic control circuit 14 and the measuring circuit 12 are electrically programmed to achieve proper sequence and synchronization of the various parts. The equipment for effecting automatic operation forms no part of this invention and need not be described here.

OPERATION

Briefly, the operation of the sampler 10 and the circuits 12, 14 and 16 is as follows. Test material is admitted to the sample tube 18 and compacted by vibrations generated by the vibrator 42. Vibration is stopped when the capacitor circuit indicates that the test material has been compacted to a standard porosity. Then the gate 48 cuts away the upper part of the material thus confining a known amount of the material in a known volume of the sample tube 18. A fixed air pressure is applied to the lower end of the sample tube 18 while the upper end of the tube is vented to atmospheric pressure. The flow of air through the sample is measured by the flow meter 114 and is converted to a measure of surface area of the sample by the monitoring instrument 120. A more detailed description of the operation is given below.

Assuming that a permeability test has just been completed and the sample tube 18 is full of test material, the equipment will be in a condition in which the gate 48 is closed, the plunger 36 seals the lower end of the end piece 28 and the vibrator is not operating. Valves 98, 104, 106 and 108 are closed, and 3-way valve 100 is in a position which places the air line 32 in communication with the air delivery line 115 from the permeability measuring circuit 12. Valve 116 in the latter is closed so that no air flows into the sample tube.

When a test is to be commenced the gate 48 is opened by retracting the ram 62 with the valve 90, and the sample tube is cleaned of test material with a blast of air admitted to the lower end of the tube 18 by opening valve 100 for a period of several seconds. The test material is forced upwardly through the passage 54 in the gate 48 and through the conduit 50 either to disposal or collection. Then a fresh batch of test material is poured into the conduit 50 manually or automatically from a hopper or conveyor. Simultaneously the plunger 36 is retracted from the lower end piece 28 by the ram 38, and the vibrator is set into operation by opening valve 98.

As test material forms a column above the porous plate 26 and is compacted by vibration, the capacitance circuit 16 continuously measures the electrical capacity of the material. The dielectric constant of the sample increases as compaction progresses, and this causes an increase in voltage from the amplifier 126. When the voltage rises to the value of the constant reference voltage at the comparator 124, the porosity of the sample equals the predetermined standard porosity, and further compaction is stopped by closing the valve 98 which controls the flow of air to the vibrator 42. The reference voltage should have a value such that the test material will be compacted to about 50% porosity, because larger porosities will result in inaccurate permeability measurements.

The upper portion of the compacted sample is then cut off by closing the gate 48. The test material residing in the vertical passage 54 in the gate 48 is deposited in the subhousing 66 and is later discharged through the cleanout tubes 76 by a blast of air supplied through the line 78. At the same time air is admitted to the top of the ring 70 by opening the valve 104 so as to seal the gate 48 to the upper end of the sample tube 18.

While the gate 48 is closing the valve 108 is opened to direct a stream of air onto the upper surface of the plunger 36 to remove any test material which may have sifted through the porous plate 26 during vibration. It is desirable to prevent any accumulation of test material in the space below the porous plate 26, because the material would be forced upwardly against the plate 26 by the previously mentioned pulse of cleaning air. Even partial clogging of the plate 26 would alter its pressure drop, and erroneous flow rate readings would be reported by the flow measuring instrument 114. If clogging were to increase with continued operation, the cleaning air pulses might eventually bend or break the plate 26.

Samples of test material prepared as described will be of the same shape and length and will have been compacted to the same electrical capacitance. For a given kind of material the capacitance is directly proportional to the porosity, or density of the sample. Accordingly, all samples will have a standard density and standard volume just as if they had been prepared by the conventional steps of weighing out a standard weight of test material and compressing the standard weight to a standard volume.

The 3-way valve 100 is then adjusted to connect the line 32 to the line 115, and the valve 116 is opened. The actual testing of the compacted sample is carried out automatically by the circuit 12 in a conventional manner. As described above the pressure regulators 110 and 114 establish a constant air pressure which is transmitted by the instrument 114 to the lines 115 and 32. The air flows upwardly through the porous plate, through the compacted sample and to atmosphere through the vent 60 in the gate 48. The screen at the lower surface of the gate 48 prevents lifting of the sample by the air flow. The fixed pressure differential should be such that the air flow through the compacted sample is laminar, because the equation by which the surface area is related to permeability assumes laminar flow. The flow meter in the instrument 114 measures the flow rate for a predetermined length of time and transmits the measurement in the form of an electrical signal to the monitor 120. As previously indicated, the signal may be employed either for data logging or as feedback information in a control loop.

Measurement of the flow rate completes the test, and the sequence may then be repeated on a new test material.

It will be understood that the equipment will first be calibrated with samples which are made up of the same material to be tested and which have known particle sizes. The technique of calibrating follows known principles and need not be described here. Generally it will be desirable to calibrate with two known sample which represent the upper and lower limits of the particle sizes expected to be encountered during use.

It will be appreciated that the capacitance measurement will depend in part on the capacitance of impurities in the sample. It is important, therefore, that the impurity level be low or constant, particularly if the primary component of the sample has a dielectric constant which is much smaller than the dielectric constant of the impurities. The impurities in this sense include any component of the powder, the proportion of which is likely to vary from sample to sample of the same type of material. Moisture is included as an impurity, and in some cases it may be highly desirable to remove this variable by drying both the sample and test gas before a test.

Other factors which should be considered are the effects of the temperature of the sample and the initial temperature of the test air on the permeability measurement. If all tests are carried out using samples of the same temperatures and test air of the same temperature, no problem exists because the temperature effects are the same for each test. On the other hand, if the temperature of the test air varies from test to test, due to changes in sample temperature or in the initial temperature of the test air, the permeability measurements will vary as a result of the different air viscosities employed with the different samples. It is therefore desirable to provide constant temperature conditions, although these variables can be compensated for if necessary.

The method and apparatus are particularly adapted to the manufacture of cement where it is conventional to measure the fineness of the ground product periodically and to adjust the operation of the grinding equipment or the classifying equipment, or both, to produce the desired fineness. It is important to obtain a closely graded product because overgrinding of large amounts of material represents an unnecessary expense, and because the strength characteristics of the concrete structure ultimately constructed are related to the particle size of the dry cement.

In summary, it is again pointed out that the feature of the present invention which relates to the preparation of a standard-porosity sample without resorting to a weighing operation depends on compacting a mass of the test material to a predetermined porosity but not on the manner in which the compaction and porosity measurement are carried out. The illustrated vibratory compaction is highly convenient because it is rapid and because it eliminates voids and other discontinuities in the test material. However, compaction can be effected also by mechanical compression or by the compressive action of compressed air delivered to one end of the sample in the form of high pressure pulses. While the electrical capacitance technique for measuring porosity is preferred from the standpoint of rapidity and economy of equipment, other techniques can be employed. For example, one known measuring instrument comprises a source of gamma radiation and a detector such as an ionization chamber. In use, the radiation source is placed on one side of the sample, and the detector is placed on the other side so as to measure the radiation which passes through the sample. When the instrument has been calibrated with a sample of the same material, the detector reading can be employed as a direct measure of porosity.

While preferred embodiments of the present invention have been described, further modifications may be made without departing from the scope of the invention. Therefore, it is to be understood that the details set forth or shown in the drawings are to be interpreted in an illustrative, and not in a limiting sense.

We claim:

1. In a method of measuring the surface area of a finely divided solid, said method being of the kind in which surface area is determined by preparing a compacted sample of the material having a standard weight, volume, length and transverse cross section, applying a differential fluid pressure to the ends of the prepared sample and measuring the resistance of the prepared sample to the flow of fluid therethrough, the improvement comprising preparing said sample by compacting an unweighed portion of the finely divided material in a predetermined standard cross sectional configuration, continuing the compacting until the density of the compacted material reaches a predetermined standard value, and removing a portion of the compacted material in an amount sufficient to leave a compacted sample of predetermined length whereby any compacted samples of the same kind of material will have a standard weight and standard volume and whereby weighing of the sample is avoided.

2. The method of claim 1 wherein the step of measuring the density of the material includes measuring the electrical capacitance of the mass of material being compacted.

3. The method of claim 1 wherein said compacting step includes the steps of placing a mass of the finely divided material in a container and vibrating the mass.

4. The method of claim 1 wherein said removing step includes the step of cutting off an end portion of the compacted material along a plane transverse to the length of the compacted material.

5. The method of claim 1 wherein said compacting step includes the step of placing a mass of the finely divided material in a generally vertical tubular member having a porous bottom wall and nonporous side walls and vibrating said material; wherein said removing step includes passing a cutting element transversely across said tubular member and through the compacted material at a predetermined distance above said porous bottom wall; and further including the step of applying a differential fluid pressure across the ends of said tubular member in order to carry out measurement of the resistance of the prepared sample to fluid flow.

6. A method for preparing a sample of a finely divided solid material prior to measuring the total surface area of the sample comprising: introducing a mass of the finely divided material into a tube; compacting the mass while measuring the density of the mass; stopping the compacting when the density of the mass increases to a predetermined value; forming the compacted mass into a sample having a predetermined length in the axial direction of the tube by removing an end portion of the compacted mass.

7. In an apparatus for preparing a sample of a finely divided solid material the particle size of which is to be measured: means defining a tube having a side wall; inlet means for introducing a mass of the finely divided material into said tube; means associated with said tube for uniformly compacting the material in said tube to a predetermined compactness and means for cutting the compacted material in said tube into a sample of standard predetermined length, said means including a cutter member movable across the bore of said tube whereby said sample has a predetermined weight and volume.

8. Apparatus as in claim 7 including means associated with said tube for measuring the resistance to fluid flow of the sample in said tube thereby to determine the fineness of the material, said measuring means including means for applying a differential fluid pressure across the ends of said tube.

9. Apparatus as in claim 7 wherein said compacting means includes a vibrator for vibrating material in said tube.

10. Apparatus as in claim 7 including an electrical capacitance measuring device associated with said tube for measuring the capacitance of material in said tube.

11. Apparatus for preparing a sample of a finely divided solid material and for measuring the resistance to fluid flow through the sample thereby to determine the particle size of the material, said apparatus comprising:
- a generally vertical tube having an upper end, a lower end and an imperforate side wall;
- a porous plate mounted transversely in said tube intermediate the ends thereof;
- a transversely movable gate mounted above said plate for movement back and forth across said tube;
- inlet means above said gate for introducing a mass of finely divided solid material into said tube;
- means associated with said tube for compacting finely divided material between said plate and said gate;
- means associated with said tube for measuring the degree of compactness of the material in said tube; and
- means for measuring the resistance of the sample in said tube to the flow of fluid therethrough including means for effecting a differential gas pressure between the location of said plate and the location of said gate;
- means for ejecting the sample from said tube; and
- electrical circuit means for automatically introducing into said inlet means said solid material, for compacting said material until a predetermined density is reached, for controlling said gate in establishing by its back and forth movement a standard length of said material, for controlling said means for measuring the resistance of the sample in said tube to the flow of fluid therethrough, and for controlling said means for ejecting said sample upon said measurement having been made, and thereupon to select a new sample in accordance with a predetermined timed cycle.

12. In an apparatus for preparing a sample of a finely divided solid material, the particle size of which is to be measured; enclosure means defining a chamber, inlet means for introducing a mass of finely divided material into said enclosure means, means associated with said enclosure means for compacting the material in said chamber to a predetermined density, means for preparing the compacted material in said chamber into a sample of standard predetermined length, means for passing a fluid through a portion of said sample having said standard predetermined length, and means for measuring the resistance of said fluid flow across said sample portion to thereby determine the fineness of said material.

13. In a method of determining the surface area of a finely divided solid material, the steps of selecting an unweighed sample of the material, placing said unweighed sample in a test chamber, compacting said unweighed sample until the density thereof reaches a predetermined standard value, passing a fluid through a predetermined standard dimension of said compacted sample, and determining the surface area of said material by the resistance of the sample to the flow of said fluid therethrough.

References Cited

UNITED STATES PATENTS

| | | | |
|---|---|---|---|
| 2,392,636 | 1/1946 | Boehler | 73—38 |
| 2,392,637 | 1/1946 | Boehler | 73—38 |
| 2,888,823 | 6/1959 | Hertel | 73—38 |
| 3,060,724 | 10/1962 | Smith et al. | 73—38 X |

LOUIS R. PRINCE, Primary Examiner

JOSEPH W. ROSKOS, Assistant Examiner

U.S. Cl. X.R.

73—38